United States Patent
Wheeler

(10) Patent No.: US 6,181,548 B1
(45) Date of Patent: Jan. 30, 2001

(54) MOUNTING SYSTEM FOR FLAT PANEL DISPLAYS IN ELECTRONIC INSTRUMENTS

(75) Inventor: Craig S. Wheeler, Santa Rosa, CA (US)

(73) Assignee: Agilent Technologies Inc., Palo Alto, CA (US)

( * ) Notice: Under 35 U.S.C. 154(b), the term of this patent shall be extended for 0 days.

(21) Appl. No.: 09/344,289

(22) Filed: Jun. 30, 1999

(51) Int. Cl.[7] .................................................. G06F 1/16

(52) U.S. Cl. ....................... 361/681; 361/825; 248/917; 312/223.1

(58) Field of Search ..................................... 361/681, 682, 361/825; 248/917–925; 345/169, 905; 312/223.1–223.7; 220/4.02; 206/706

(56) References Cited

U.S. PATENT DOCUMENTS

| | | | |
|---|---|---|---|
| 5,746,408 | * | 5/1998 | Theirl et al. .......................... 248/918 |
| 6,061,231 | * | 5/2000 | Crockett ............................... 361/681 |
| 6,111,760 | * | 8/2000 | Nixon ................................... 361/814 |

* cited by examiner

Primary Examiner—Leo P. Picard
Assistant Examiner—Hung Van Duong
(74) Attorney, Agent, or Firm—John L. Imperato

(57) ABSTRACT

A display mounting system for electronic instruments includes an elastomeric mount having a continuous frame that secures an electrically conductive, optically transmissive plate in alignment with a viewing surface of the display. A compressible ridge protruding from an internal surface of the frame is interposed between the plate and the viewing surface and disposed about the perimeter of the plate, forming an environmental seal between a rear surface of the plate and the viewing surface of the display. A first series of tabs distributed along a front edge of the frame adjacent to the internal surface engage the front surface of the plate while a second series of tabs distributed along a rear edge of the frame adjacent to the internal surface and opposite from the front edge engage a back surface of the display. Tension in the continuous frame between the first and the second series of tabs biases the plate toward the display and maintains the environmental seal between the plate and display during servicing of the display, eliminating the need for a controlled servicing environment. A planar mating surface protruding from an internal surface of the continuous frame uniformly distributes mechanical forces on the display, reducing mechanical stresses on the display when it is installed onto an electronic instrument. A pair of optionally included hinges enables a circuit board to be captured adjacent to the back surface of the display.

18 Claims, 3 Drawing Sheets

MOUNTING SYSTEM FOR FLAT PANEL DISPLAYS IN ELECTRONIC INSTRUMENTS

BACKGROUND OF THE INVENTION

The compact size, high reliability and optical characteristics of flat panel displays makes them well-suited for use in electronic instruments. However, flat panel displays are sensitive to mechanical stresses imposed on the displays when they are mounted in instruments and the displays require periodic servicing to replace backlighting lamps for the viewing portion of the displays.

Presently, flat panel displays are mounted onto the front frame of an electronic instrument using screws that are threaded through a series of mounting holes provided on the display assembly. The front frame requires precision machining to achieve flatness so that mechanical forces on the display are uniformly distributed when the screws are tightened. Nonuniform forces induce mechanical stresses on the display that result in visible fringing patterns on the viewing surface of the display. While the precision machined front frame accommodates the display's sensitivity to mechanical stresses, the machining process is time-consuming and increases the manufacturing cost of the electronic instrument in which the flat panel display is used.

In order to protect the viewing portion of the flat panel display and to provide electromagnetic shielding for an electronic instrument, a glass plate, or optical window, is typically positioned between the flat panel display and the front frame. Additional hardware used to secure the glass plate to the front frame makes assembling and servicing the flat panel displays time consuming.

In presently available instruments, a compressible gasket placed between the flat panel display and the glass plate forms an environmental seal that prevents dust and moisture from entering the interstitial space between the glass plate and display and obscuring the viewing portion of the display. When the flat panel display is serviced, the seal is broken and the display needs to be reinstalled in a low moisture, low particulate environment to maintain visual clarity of the interstitial space. When such an environment is not present, the instrument must be transported to a suitable servicing environment to reinstall the display, adding to the inconvenience and cost of replacing the backlighting lamps in the flat panel display.

Accordingly, there is a need for a mounting system for flat panel displays that accommodates for sensitivity of the displays to mechanical stresses and that provides for quick assembly and servicing of the flat panel displays in electronic instruments.

SUMMARY OF THE INVENTION

A display mounting system constructed according to the preferred embodiment of the present invention provides for quick assembly and servicing of flat panel displays in electronic instruments. The mounting system accommodates for sensitivity of the displays to mechanical stresses and eliminates the need for a controlled environment when servicing the display or the electronic instrument in which the display is used. The system includes an elastomeric mount having a continuous frame that secures an electrically conductive, optically transmissive plate in alignment with a viewing surface of the display. A compressible ridge protruding from an internal surface of the frame is interposed between the plate and the viewing surface and disposed about the perimeter of the plate, forming an environmental seal between a rear surface of the plate and the viewing surface of the display. A first series of tabs distributed along a front edge of the frame adjacent to the internal surface engage the front surface of the plate while a second series of tabs distributed along a rear edge of the frame adjacent to the internal surface and opposite from the front edge engage a back surface of the display. Tension in the continuous frame between the first and the second series of tabs biases the plate toward the display and maintains the environmental seal between the plate and display during servicing of the display, eliminating the need for a controlled servicing environment. A planar mating surface protruding from an internal surface of the continuous frame uniformly distributes mechanical forces on the display, reducing mechanical stresses on the display when it is installed onto an electronic instrument. A pair of optionally included hinges enables a circuit board to be captured adjacent to the back surface of the display.

DETAILED DESCRIPTION OF THE PREFERRED EMBODIMENT

Figure 1:
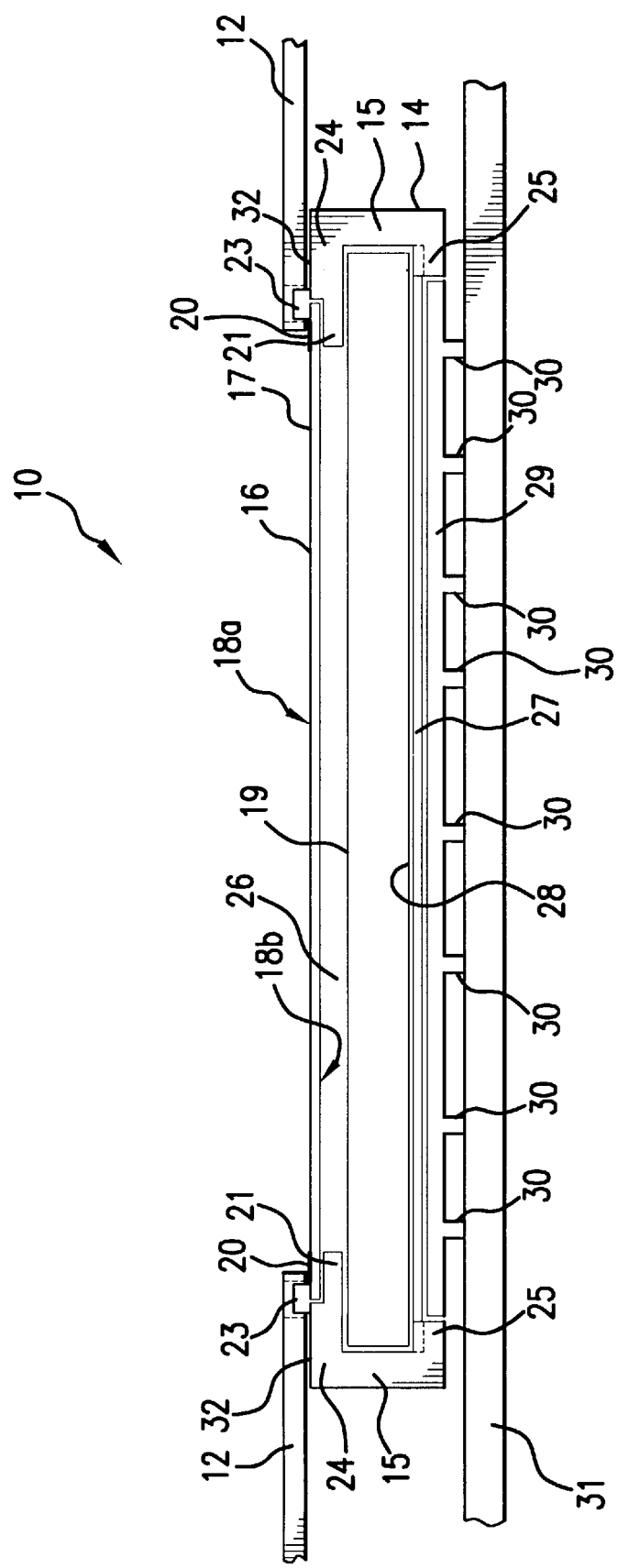
FIG. 1 shows a side view of the display mounting system constructed according to the preferred embodiment of the present invention.

FIG. 1 shows a cross-sectional view of the system 10 for mounting a flat panel display 11 in an electronic instrument constructed according to the preferred embodiment of the present invention. A front frame 12 of an electronic instrument is shown. An elastomeric mount 14, fabricated using injection-moldable rubber with a durometer of 64 Shore A or another suitable elastomeric material, has continuous frame 15 that circumscribes the display 11 and an optical window 16. Typically, the optical window 16 is a glass plate 17 that has a layer of indium tin oxide (ITO) deposited on a front surface 18 and a layer of anti-reflective coating on top of the ITO layer. The ITO layer makes the optical window 16 electrically conductive. The optical window 16 is optically transmissive and is secured in alignment with a viewing surface 19 of the display 11 by the continuous frame 15. The optical window 16 has an electrically conductive border 20 that is electrically coupled to the ITO layer on the front surface 18a of the glass plate 17. In this example, the conductive border 20 is capacitively coupled to the ITO layer through the anti-reflective coating. The conductive border 20 makes electrical contact with the front frame 12 so that the coupling between the electrically conductive ITO layer and the front frame 12 provides electromagnetic shielding for the electronic instrument.

A compressible ridge 21 protrudes from an internal surface 22 of the continuous frame 15 and extends around the perimeter of the optical window 16. The compressible ridge 21 is interposed between a rear surface 18b of the glass plate 17 and the viewing surface 19 of the display 11. A series of front tabs 23 on the front edge 24 of the continuous frame 15 secure the glass plate 17 in the frame while a series of rear tabs 25 secure the display 11 in the frame 15. Tension in the frame 15 of the elastomeric mount 14 biases the glass plate 17 toward the display 11 compressing the compressible ridge 21. A cavity 26 is formed between the rear surface 18b of the glass plate 17 and the viewing surface 19 of the display 11 and an environmental seal is formed between the glass plate 17 and the display 11 by the compressible ridge 21. Typically, the glass plate 17 and the display 11 are initially installed in the elastomeric mount 14 in a low moisture, low particulate environment to ensure optical clarity of the cavity 26. Due to the force between the front tabs 23 and the rear tabs 25 created by the tension in the frame 15, the environmental seal is maintained whether or not the mounting system including the frame 15, glass plate 17 and display 11 is installed in the front frame 12 of an electronic instrument.

Figure 2:
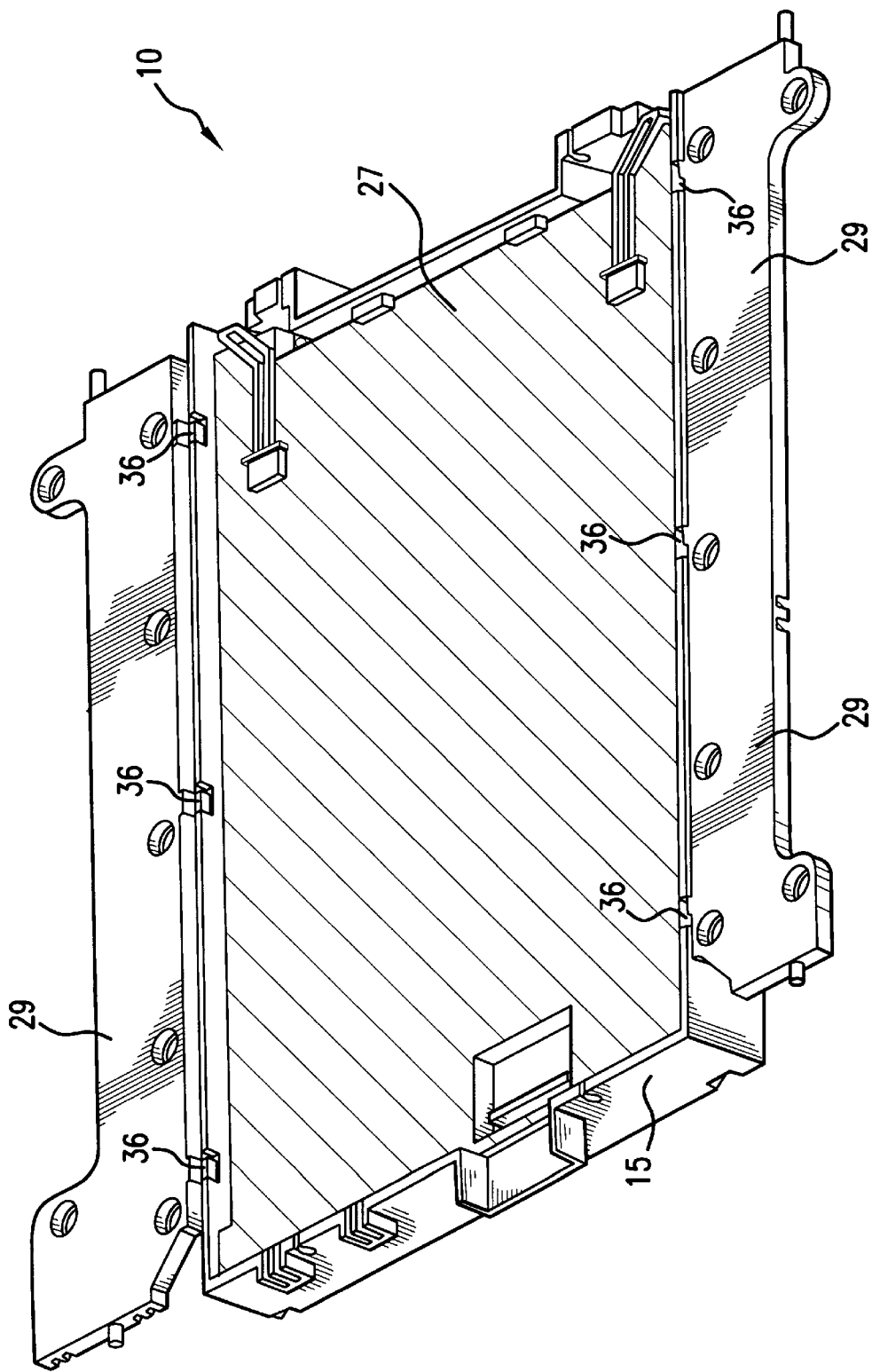
FIGS. 2 and 3 show perspective views of the display mounting system constructed according to the preferred embodiment of the present invention.

To provide further electromagnetic shielding in an electronic instrument in which the flat panel display 11 is used, a circuit board 27 having at least one conductive ground plane is positioned behind a back surface 28 of the display 11. When the circuit board 27 is included in the display mounting system a pair of hinges 29, as shown in the perspective view of the system in FIG. 2, capture the circuit board 27 and secure the board 27 adjacent to the back surface 28 of the display 11. FIG. 2 shows the hinges 29 in an open position. In this example, the hinges 29 are pivotally mounted to the continuous frame 15 using living pivots 36 that are formed continuously with the frame 15 and hinges 29. With the hinges 29 in the open position, the circuit board 27 is removable to provide access to the back surface 28 of the display 11. The backlighting lamps (not shown) used to illuminate the viewing surface 19 of the display 11 are accessible through side ports (not shown) in the continuous frame 15 so that the backlighting lamps can be replaced without breaking the environmental seal between the glass plate 17 and the display 11.

The side-view of FIG. 1 shows the hinges 29 in a closed position in which the circuit board 27 is captured. A series of compressible standoffs 30 are formed on the surface of the hinges 29 that are opposite the surface adjacent to the circuit board 27. The compressible standoffs 30 are distributed over the surface of the hinges 29 and receive a planar member 31, such as a sheet metal component positioned behind elastomeric mount 14. The planar member 31 is screwed into the front frame 12 of the electronic instrument (not shown). Forces exerted on the compressible standoffs 30 by the planar member 31 are transferred to a mating surface 32 formed on the front edge of the continuous frame 15. The mating surface 32 is coplanar with the front surface 18a of the glass plate 17 and contacts the front frame 12, uniformly distributing mechanical forces exerted on the display 11. The uniform distribution of mechanical forces reduces mechanical stresses on the display 11, eliminating visible fringing patterns on the viewing surface 19 of the display 11.

Figure 3:
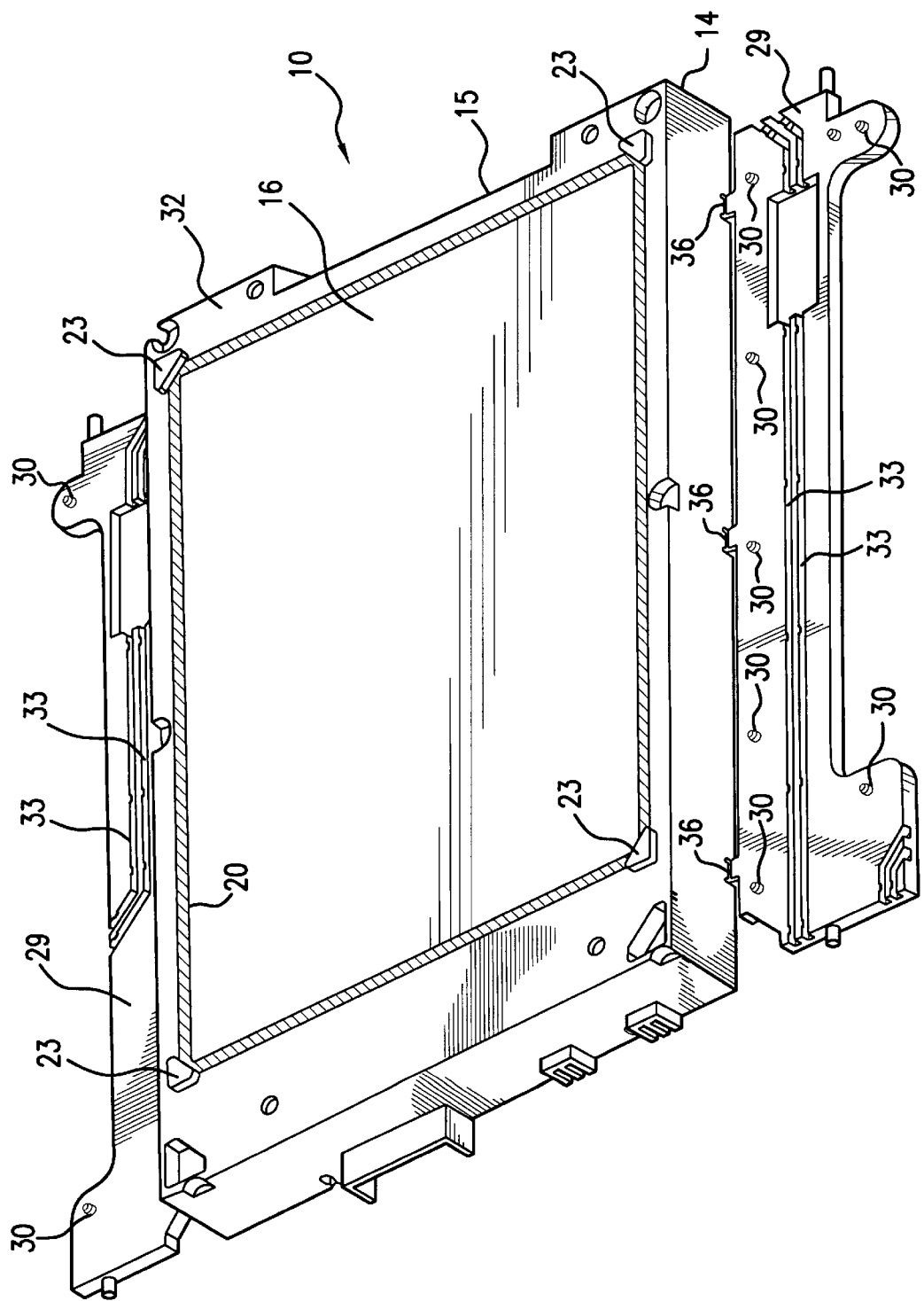

FIG. 3 shows an alternate perspective view of the system for mounting flat panel displays in electronic instrument constructed according to the preferred embodiment of the present invention. The hinges 29 are shown in the open position. One or more conduits 33 are optionally formed in the hinges 29 to accommodate wires or other electrical conductors (not shown) when the hinges 29 are in the closed position.

The elastomeric mount 14 and the glass plate 17 and display 11 as secured in the mount as shown in FIGS. 2 and 3 provide a display mounting system that can be assembled quickly. The elastomeric mount accommodates the sensitivity of flat panel displays 11 to mechanical stresses by uniformly distributing mechanical forces on the displays 11. The display mounting system provides for quick installation and removal from an electronic instrument for quick servicing. The environmental seal is maintained when the display 11 and glass plate 17 are removed from an electronic instrument and maintained in the elastomeric mount 14, eliminating the need for a controlled servicing environment.

While the preferred embodiment of the present invention has been illustrated in detail, it should be apparent that modifications and adaptations to the embodiment may occur to one skilled in the art without departing from the scope of the present invention as set forth in the following claims.

What is claimed is:

1. An elastomeric mount for securing a display having a viewing surface and a back surface to a glass plate having a front and a rear surface, comprising:

a continuous frame circumscribing the display and plate, aligning the plate with the viewing surface, a compressible ridge protruding from an internal surface of the frame interposed between the plate and the viewing surface and disposed about the perimeter of the plate, a first series of tabs distributed along a front edge of the frame adjacent to the internal surface and engaging the front surface of the plate, a second series of tabs distributed along a rear edge of the frame adjacent to the internal surface and opposite from the front edge, engaging the display at the back surface, wherein tension in the continuous frame between the first series of tabs and the second series of tabs biases the plate toward the display forming a cavity bounded by the rear surface of the plate, the viewing surface of the display and the compressible ridge.

2. The elastomeric mount of claim 1 further comprising a mating surface formed on the front edge of the continuous frame and coplanar with the front surface of the plate.

3. The elastomeric mount of claim 2 wherein the continuous frame is rectangular, the first series of tabs positioned at the corners of the continuous frame on the front edge, and the second series of tabs positioned at the corners of the continuous frame along the rear edge.

4. The elastomeric mount of claim 3 further comprising a first hinge pivotally fastened along a first side of the rear edge of the continuous frame and a second hinge pivotally fastened along a second side of the rear edge of the continuous frame wherein access to the back surface of the display is provided when the first hinge and the second hinge are in an open position.

5. The elastomeric mount of claim 4 wherein a circuit board, when positioned adjacent to the back surface of the display, is captured by the first hinge and the second hinge when the first hinge and the second hinge are in a closed positioned.

6. The elastomeric mount of claim 4 wherein the first hinge and the second hinge are pivotally mounted to the continuous frame using living pivots.

7. The elastomeric mount of claim 5 wherein the first hinge and the second hinge each include a series of compressible standoffs for contacting a planar member and for transferring force from the planar member to the mating surface.

8. The elastomeric mount of claim 5 wherein at least one of the first hinge and the second hinge includes at least one conduit receiving wiring from the display when the corresponding one of the at least first hinge and second hinge are in the closed position.

9. A display mounting system for electronic instruments, comprising:

an optically transmissive, electrically conductive plate having a front surface and a rear surface;

a display having a viewing surface and a back surface; and an elastomeric mount securing the plate in alignment with the viewing surface and having a continuous frame circumscribing the display and plate, a compressible ridge protruding from an internal surface of the frame interposed between the plate and the viewing surface and disposed about the perimeter of the plate, a first series of tabs distributed along a front edge of the frame adjacent to the internal surface and engaging the front surface of the plate, a second series of tabs distributed along a rear edge of the frame adjacent to the internal surface and opposite from the front edge, engaging the display at the back surface, wherein tension in the continuous frame between the first series of tabs and the second series of tabs biases the plate toward the display forming a cavity bounded by the rear surface of the plate, the viewing surface of the display and the compressible ridge.

10. The display mounting system of claim 9 wherein the elastomeric mount further includes a mating surface protruding from an external surface of the continuous frame and coplanar with the surface of the plate.

11. The display mounting system of claim 10 wherein the continuous frame is rectangular, the first series of tabs positioned at the corners of the continuous frame on the front edge, and the second series of tabs positioned at the corners of the continuous frame along the rear edge.

12. The display mounting system of claim 10 wherein the plate has a conductive border on the front surface, coupling the optically transmissive, electrically conductive plate to the electronic instrument.

13. The display mounting system of claim 11 wherein the elastomeric mount further includes a first hinge pivotally fastened along a first side of the rear edge of the continuous frame and a second hinge pivotally fastened along a second side of the rear edge of the continuous frame wherein access to the back surface of the display is provided when the first hinge and the second hinge are in an open position.

14. The display mounting system of claim 13 further comprising a circuit board positioned adjacent to the back surface of the display.

15. The display mounting system of claim 13 wherein the first hinge and the second hinge are pivotally mounted to the continuous frame using living pivots.

16. The display mounting system of claim 13 wherein at least one of the first hinge and the second hinge includes at least one conduit receiving wiring from the display when the corresponding one of the at least first hinge and second hinge are in the closed position.

17. The display mounting system of claim 14 wherein the circuit board is captured by the first hinge and the second hinge when the first hinge and the second hinge are in a closed positioned.

18. The display mounting system of claim 17 further comprising a planar member adjacent to the first hinge and the second hinge when the first hinge and the second hinge are in the closed position and wherein the first hinge and the second hinge each include a series of compressible standoffs contacting the planar member and for transferring force from the planar member so that the mating surface contacts the electronic instrument.

\* \* \* \* \*